March 14, 1950
A. K. JORDAN
2,500,361
BAKER'S DUMP TABLE
Filed March 8, 1948
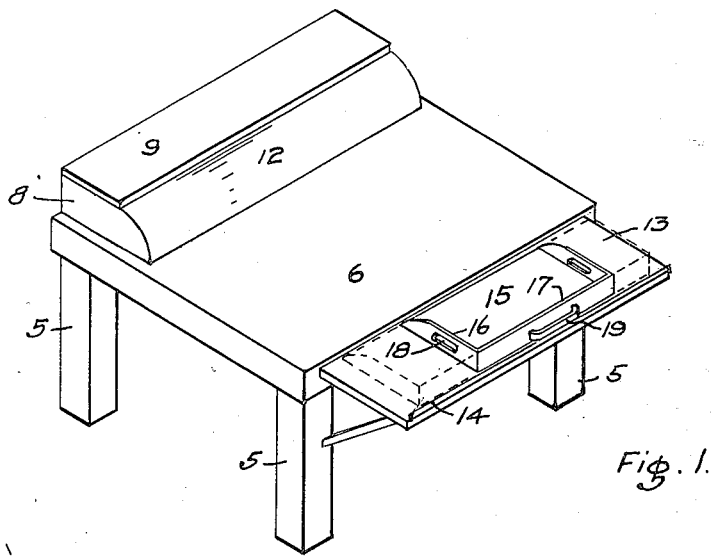
Fig. 1.
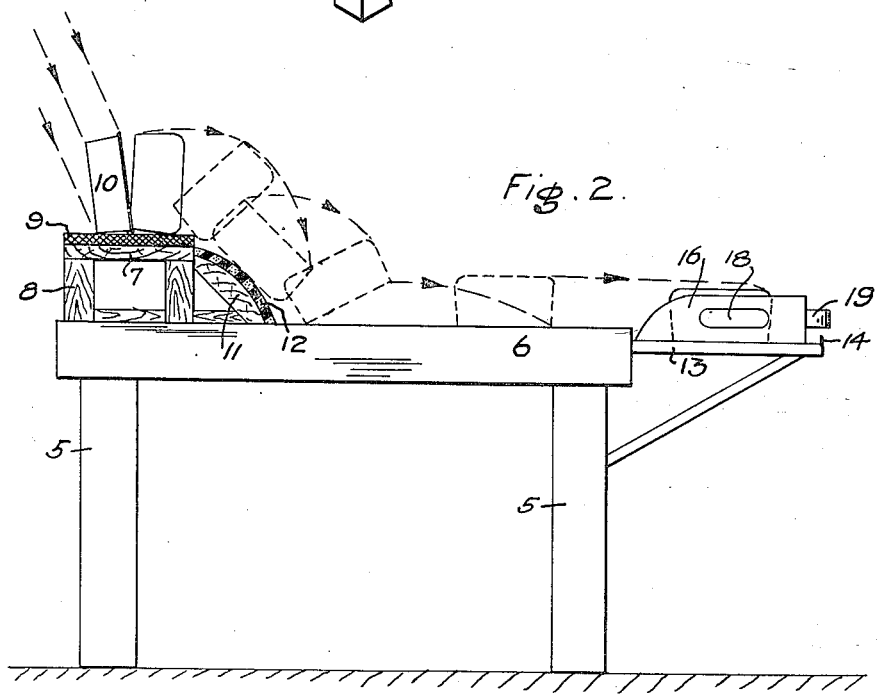
Fig. 2.
Arthur K. Jordan
INVENTOR
BY 
ATTORNEY Patented Mar. 14, 1950

2,500,361

UNITED STATES PATENT OFFICE 2,500,361

BAKER'S DUMP TABLE

Arthur K. Jordan, Tacoma, Wash.

Application March 8, 1948, Serial No. 13,562

5 Claims. (Cl. 193—43)

This invention relates to apparatus for use in a commercial bakery, and has special reference to the means of transferring the hot baked loaves from the pans in which they are baked, to the cooling rack in which they are cured.

The objects of my invention are, first, to form the dump table in such manner that the dumped loaves will leave the pans in which they are baked and will automatically reach the removing tray in upright position ready to be transferred to the cooling rack; second, to provide such a dump table with cushioning means whereby the pans are not injured as they strike the table to force the loaves to break loose therefrom; third, to provide a cushioning and retarding means whereby each falling loaf is caused to turn completely over as it proceeds downward and without injury to the crust of the loaf; fourth, to so proportion the parts that after the loaf has left the said retarding means, its corner strikes the horizontal portion of the table to complete its somersault, under the momentum of its fall, and slide in an upright position across the table to the receiving tray; and fifth, to provide such a dump table as is simple and durable in construction, of low cost, and very efficient in operation.

I attain these and other objects as will readily be perceived by those engaged in the art by the devices and arrangements illustrated in the accompanying drawings in which—

Fig. 1 is a perspective view of my improved dump table; and Fig. 2 is a side view thereof showing, in broken lines, the course of a loaf in passing from the baking pan to the transfer tray.

Identical numerals of reference refer to the same parts throughout the several views.

In commercial bakeries the loaves leave the bake ovens while still contained in their pans and are transferred therefrom by means of a continuous moving conveyor belt from which the loaves are placed in the cooling racks, after they have been removed from the pans. My improved table occupies the position between the end of the conveyer belt and the cooling racks and is intended to deliver the loaves in upright position to the handler who transfers them in a tray to the cooling racks.

In order to accomplish this with the least labor and waste of time I have invented the following described dump table.

The first operator takes a group of pans off the conveyer, raises them slightly, and simultaneously gives them a slight turn, and brings them down so that the end edges of all of the pans hit the dump shelf, thus loosening the loaves from the pans and projecting them down the curved ramp or apron to the horizontal part of the table. The momentum of the several loaves thus projected causes them to spill over the shelf and turn upside down on the apron. The apron engages and retards the upper crust of the loaves, which continue downward, thus completing the turning movement when they reach the table. The momentum of the fall carries them forward without further turning motion, sliding them freely toward the second operator on the other side of the table, who directs them into the receiving tray and then transfers them to the cooling rack.

The table comprises suitable supporting legs 5 and a flat horizontal surface 6 which is preferably covered with galvanized metal. A raised horizontal receiving or dump shelf 7 is supported over the receiving end of the table. This shelf 7 is supported on a suitable frame 8 which may be of any desired form. The shelf 7 is covered with a suitable padding or cushion 9 adapted to prevent damage to the pans 10 as they are brought down thereon with some force by the first operator. This cushion 9 may be of suitable cotton belting.

The structure 8 has a ramp or apron 11 whose exposed surface may preferably be curved downward from a point slightly below the shelf cushion 9 to the table surface 6 and this exposed surface is covered with a suitable resilient cushion 12, preferably of sponge rubber.

A delivery shelf 13 extends outward from the opposite end of the table 6 and is suitably supported therefrom. The level of this shelf 13 is slightly below that of the table 6. The outer edge of the shelf 13 is provided with a suitable stop 14 adapted to hold the below described tray 15 in place.

A transfer tray 15 rests on the shelf 13 and is adapted to receive the loaves as they slide across the table 6, being guided, if necessary, by the second operator. The tray 15 is preferably made of aluminum and is provided with vertical sides 16 and a back flange 17. The sides 16 are provided with suitable hand holes 18, and the back 17 has a suitable handle 19.

In Fig. 2 is illustrated the operation of my improved dump table. A group of pans 10 are picked up from the conveyor belt by the first operator, who stands beside the receiving end of the table, and are raised and slightly tilted by him so as to bring their ends forcibly down on the shelf 7, the padding 9 preventing damage thereto, thus shaking the several loaves of bread from the pans and precipitating them down the ramp 11, whose soft surface 12 prevents damage to the tender crust of the several loaves and also causes them to roll endwise so that they will fall in upright position on the smooth metal surface of the table 6 and slide thereacross towards the second operator who guides them into the transfer tray 15, whence they are removed to the cooling rack.

The flat part of the table 6 and of the shelf 13 are completely covered with galvanized metal so that they may always be kept in absolutely sanitary condition.

It is, of course, understood that many changes may be made in the details of construction of my improved baker's dump table as above described, without departing from the spirit of my invention as outlined in the appended claims.

Having, therefore described my invention, what I claim and desire to secure by Letters Patent, is:

1. A baker's dump table adapted to receive pans of loaves of bread and to cause the loaves to fall therefrom and to turn into upright positions having, in combination, an elevated shelf adapted to receive the loaves from the pans; a downward inclined convex retarding ramp of a peripheral length slightly longer than the length of a loaf; and a lower surface, whereby the loaves are projected from the shelf and are caused to turn over endwise on the ramp and to slide on the lower surface in upright position.

2. A baker's dump table as set forth in claim 1, together with a depressed shelf extending from the said lower surface of the table and adapted to receive means to receive and transport the loaves from the said lower surface.

3. A baker's dump table as set forth in claim 1, wherein said elevated shelf is padded.

4. A baker's dump table as set forth in claim 1, wherein said downward inclined convex retarding ramp is of increasing pitch away from said elevated shelf.

5. A baker's dump table as set forth in claim 1, wherein said downward inclined convex retarding ramp is surfaced with a soft retarding element adapted to cause the loaves projected thereon to somersault as they pass thereon downward.

ARTHUR K. JORDAN.

REFERENCES CITED

The following references are of record in the file of this patent:

UNITED STATES PATENTS

| Number | Name | Date |
|---|---|---|
| 1,432,747 | Eggert | Oct. 24, 1922 |
| 2,271,937 | Engels | Feb. 3, 1942 |